United States Patent [19]

Begin et al.

[11] Patent Number: 5,050,430

[45] Date of Patent: Sep. 24, 1991

[54] MAGNETOSTRICTIVE LINEAR POSITION DETECTOR WITH TEMPERATURE SENSORS

[75] Inventors: John D. Begin; Richard D. Koski, both of Troy, Mich.

[73] Assignee: MagneTek Controls, Clawson, Mich.

[21] Appl. No.: 540,568

[22] Filed: Jun. 19, 1990

[51] Int. Cl.⁵ ............... G01F 23/30; G01K 7/16; G01K 23/62; G01B 7/26

[52] U.S. Cl. .................. 73/292; 73/290 V; 73/319; 73/313; 374/142; 324/207.13; 324/207.24; 324/209; 333/148

[58] Field of Search .......... 73/290 V, 292, 314, 73/319, 453, 447, 778, 313; 374/142; 324/207.13, 207.24, 209, 244, 260; 333/148; 361/267, 143

[56] References Cited

U.S. PATENT DOCUMENTS

| | | | |
|---|---|---|---|
| 2,334,593 | 11/1943 | Wyckoff | 175/183 |
| 2,401,094 | 5/1946 | Nicholson, Jr. | 161/15 |
| 3,011,136 | 11/1961 | Scarrott | 333/30 |
| 3,111,027 | 11/1963 | Moffatt et al. | 73/67.8 |
| 3,154,946 | 11/1964 | Ordorica et al. | 73/313 |
| 3,189,849 | 6/1965 | Tellerman | 333/30 |
| 3,208,281 | 9/1965 | Kalmus et al. | 73/313 |
| 3,225,312 | 12/1965 | Tellerman | 331/157 |
| 3,290,649 | 12/1966 | Whitehouse | 340/146.2 |
| 3,371,536 | 3/1968 | Tellerman | 73/386 |
| 3,372,592 | 2/1968 | Gravert | 73/313 |
| 3,413,544 | 11/1968 | Jotten et al. | 324/68 |
| 3,423,673 | 1/1969 | Bailey et al. | 324/34 |
| 3,492,667 | 1/1970 | Gratian | 340/174 |
| 3,537,085 | 10/1970 | Mayer et al. | 340/182 |
| 3,678,750 | 7/1972 | DiNoia et al. | 73/313 |
| 3,898,555 | 8/1975 | Tellerman | 324/34 |
| 4,006,637 | 2/1977 | Kinosita | 73/313 |
| 4,028,619 | 6/1977 | Edwards | 324/34 |
| 4,071,818 | 1/1978 | Krisst | 324/208 |
| 4,144,519 | 9/1979 | Chameul | 340/16 R |
| 4,158,964 | 6/1979 | McCrea et al. | 73/290 |
| 4,236,144 | 11/1980 | Sunagawa | 340/870.18 |
| 4,238,844 | 12/1980 | Ueda et al. | 367/117 |
| 4,305,283 | 12/1981 | Redding | 73/290 |
| 4,361,037 | 11/1982 | Hauschild et al. | 73/295 |
| 4,471,403 | 9/1984 | Dress, Jr. et al. | 361/267 |
| 4,503,419 | 3/1985 | Kidd et al. | 340/59 |
| 4,510,587 | 4/1985 | Schneider | 367/118 |
| 4,530,161 | 7/1985 | Blankenship | 33/178 |
| 4,571,095 | 2/1986 | Stoffels | 374/167 |
| 4,721,902 | 1/1988 | Tellerman et al. | 324/585 |
| 4,726,226 | 2/1988 | Tellerman | 73/292 |
| 4,803,427 | 2/1989 | Mason et al. | 73/314 |
| 4,839,590 | 6/1989 | Koski et al. | 73/290 V |
| 4,939,457 | 7/1990 | Tellerman | 73/314 |
| 4,943,773 | 7/1990 | Koski et al. | 73/290 V |
| 5,585,979 | 4/1986 | Hasselmark et al. | 318/118 |

FOREIGN PATENT DOCUMENTS

| | | | |
|---|---|---|---|
| 827258 | 2/1960 | United Kingdom | 40/8 |
| 896714 | 5/1962 | United Kingdom | 40/8 |
| 1886079 | 3/1975 | United Kingdom | |

Primary Examiner—William A. Cuchlinski, Jr.
Assistant Examiner—Diego F. F. Gutierrez
Attorney, Agent, or Firm—Krass & Young

[57] ABSTRACT

The present invention is a combined magnetostrictive linear displacement detector and plural location temperature detector. The combined apparatus produces a composite signal for transmission on a 2 wire transmission line. The resistances of the temperature sensitive resistors as well as two reference resistors are measured in a predetermined sequence. The linear displacement is measured by the length of time required for a torsional strain to travel along the magnetostrictive wire to the position of the magnet. A pulse generator generates a predetermined number of pulses for each resistance measurement having pulse period corresponding to the measured resistance, with the minimum such pulse period preferably being greater than twice the maximum time required for a torsional strain to propagate the length of the magnetostrictive wire. An electrical signal is supplied to the transmission line when either said pulse generator generates a pulse or the induced electrical signal is detected. The time between the pairs of pulses indicates the linear displacement fixed by the magnet. The time between pulse pairs is a measure of one of the resistances. The combined apparatus of the present invention also periodically degausses the magnetostrictive wire at a time when no displacement measurement is taking place.

15 Claims, 3 Drawing Sheets

fixed pulse periods enabling correction for any component drift.

MAGNETOSTRICTIVE LINEAR POSITION DETECTOR WITH TEMPERATURE SENSORS

TECHNICAL FIELD OF THE INVENTION

This invention relates to liquid level detectors of the type including a linear magnetostrictive wire, and more particularly to such liquid level detectors which also detect the liquid temperature at various positions.

BACKGROUND OF THE INVENTION

The usefulness of the phenomenon of magnetostrictivity in linear distance or position measuring devices is recognized by the prior art; for example, see Redding, U.S. Pat. No. 4,305,283; McCrea et al., U.S. Pat No. 4,158,964; Krisst, U.S. Pat. No. 4,071,818; Edwards, U.S. Pat. No. 4,028,619; and Tellerman, U.S. Pat. No. 3,898,555. A magnet surrounding the magnetostrictive wire marks the location to be measured. Such devices can operate with either mechanical or electrical excitation. When a torsional strain propagating along the wire reaches the area of influence of the magnet an electrical signal is generated. Conversely, when an electrical signal propagating along the wire reaches the area of influence of the magnet a torsional strain is generated. Such linear position detectors are utilized as liquid level detectors. The position of the magnet, and hence the liquid level, is determined as a function of the time required for a torsional disturbance to propagate from one end of the wire through the area of influence of the magnet in the case of mechanical excitation or from the position of the magnet to a sensing apparatus located at one end of the wire in the case of electrical excitation.

In the field of liquid level detection, it is often useful to simultaneously measure liquid level and measure liquid temperature at one or more locations. Many liquids change volume with temperature. Thus a measurement based upon level alone would not distinguish between cases where the mass of liquid had changed and where the mass of liquid is the same but the volume has changed due to a temperature change. Tellerman, U.S. Pat. No. 4,726,226 has proposed a combined apparatus for simultaneously detecting liquid level using a magnetostrictive position detecting apparatus and detecting temperature at a plurality of positions within the liquid via temperature sensitive resistors. Tellerman, U.S. Pat. No. 4,726,226, teaches an encoding technique for transmitting both position and temperature information to a remote site using a single pair transmission line. The resistances of the temperature sensitive resistors are measured and these values are used to vary the period of a pulse generator. Position measurements are made at the varying pulse periods of the pulse generator. A composite signal is transmitted on the transmission line in the form of a series of paired pulses. The time between each pair of pulses is a measure of the liquid level. The time between consecutive pairs corresponds to one of the temperature measurements. The sequence of temperature measurements is known to the apparatus receiving the signal via the transmission line, enabling the pulse period to be translated into temperature. Tellerman, U.S. Pat. No 4,726,226, further teaches the use of two precision temperature independent resistors one having a resistance less than the range of the temperature sensitive resistors and one having a resistance greater than this range. These fixed resistances provide fixed pulse periods enabling correction for any component drift.

SUMMARY OF THE INVENTION

The present invention is a combined magnetostrictive linear displacement detector and plural location temperature detector. This combined apparatus includes a magnetostrictive wire defining a measurement interval and a return wire having a foot end electrically coupled to the foot end of the magnetostrictive wire. A magnet displacable along the measurement interval defines the linear displacement to be detected. The combined apparatus also includes a plurality of temperature sensitive resistors disposed at intervals within the measurement interval. The combined apparatus produces a composite signal for transmission on a 2 wire transmission line including information regarding the linear displacement measured and the temperature measured by each temperature sensitive resistor.

The resistance of the temperature sensitive resistors is measured in a predetermined sequence employing a sequential switching circuit. The resistance of a first reference resistor having a temperature independent resistance which is less than the lowest expected resistance of the temperature sensitive resistors is first measured. Next, the resistance of a second reference resistor having a temperature independent resistance which is greater than the highest expected resistance of the temperature sensitive resistors is measured. Then, the resistances of the temperature sensitive resistors are measured in a predetermined sequence.

The linear displacement is measured by the length of time required for a torsional strain to travel along the magnetostrictive wire to the position of the magnet. A pulse generator generates a predetermined number of pulses for each resistance measurement. In the preferred embodiment this predetermined number is eight or sixteen. The pulse period corresponds to the measured resistance, with the minimum such pulse period preferably being greater than twice the maximum time required for a torsional strain to propagate the length of the magnetostrictive wire. The pulse generator triggers a torsional motion excitation means which imparts a predetermined torsional motion within the magnetostrictive wire at the head end. When the torsional strain passes the magnet an electrical signal is induced which is detected electrically. The time between the production of the torsional strain and the detection of the induced electrical signal is a measure of the location of the magnet.

An electrical line driver circuit generates an electrical signal for transmission via the transmission line when either the pulse generator generates a pulse or the induced electrical signal is detected. This results in transmission of pairs of pulses on the transmission line. The time between the pairs of pulses indicates the linear displacement fixed by the magnet. The time between adjacent first pulses, which is set by the pulse period of the pulse generator, is a measure of one of the resistances. Because the minimum pulse period is more than twice the maximum propagation delay in the magnetostrictive wire, the utilization device can unambiguously determine the first pulse in each pair. Because the reference resistors are measured sequentially, and because the greatest possible difference in pulse period is between that of the reference resistors, the utilization device can also synchronize with the sequence of resistance measurements. Thus the linear displacement and each of the measured temperatures can be transmitted via the transmission line. This permits the utilization device to compute a volume corrected for variations in temperature when the linear displacement is the liquid level in a tank.

The combined apparatus of the present invention also periodically degausses the magnetostrictive wire. A degaussing driver circuit applies at least one degaussing electrical pulse to the series connection of the magnetostrictive wire and the return wire following at least some of the pulses from the pulse generator. These degaussing pulses are generated during a time when no displacement measurement is taking place. Relative to the most recent pulse, the degaussing takes place after the latest expected detection of an induced electrical signal and prior to the earliest expected generation of the next pulse. In the preferred embodiment this is between the maximum propagation time in the magnetostrictive wire and twice this maximum propagation time. The degaussing may be via: a single degaussing pulse following each pulse from pulse generator; a predetermined plurality of degaussing pulses following each pulse from the pulse generator; or at least one degaussing pulse for each predetermined number of pulses from the pulse generator.

BRIEF DESCRIPTION OF THE DRAWINGS

These and other objects and aspects of the present invention will become clear from the following description of the invention, in which.

DETAILED DESCRIPTION OF THE PREFERRED EMBODIMENT

Figure 1:
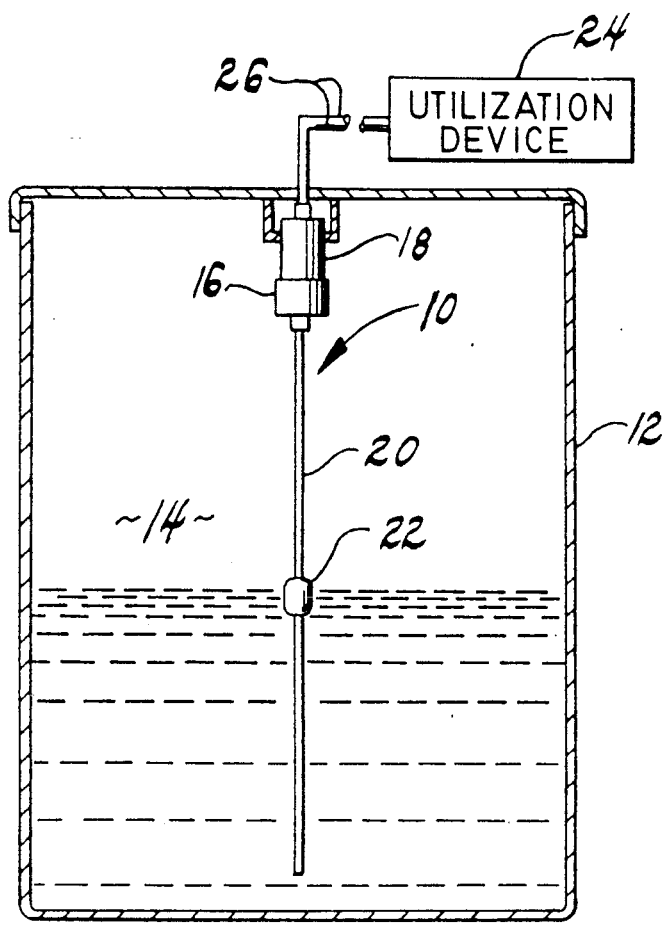
FIG. 1 is a cutaway side view of a liquid level detector embodying the present invention.

Referring to FIG. 1 there is shown a combined magnetostrictive liquid level detector and plural location temperature detector device 10 disposed in fixed relationship within a tank 12 for fluid 14 such as gasoline, the level of which may vary from empty to a full condition near the top of tank 12. In FIG. 1 tank 12 is slightly less than half full. Device 10 comprises a head portion 16 having a fluid tight cap 18 which protects certain electronic components hereinafter described, a stainless steel tube 20 which extends vertically through tank 12 and through the fluid level measurement field which, in this case, is from a point near the bottom of tank 12 to a point close to but spaced approximately 8 to 12 inches from the top of tank 12; i.e., normal maximum fluid level is such that head 16 and cap 18 are not normally submerged. Mounted on tube 20 for sliding displacement therealong is a float 22 which contains a circular magnet for purposes hereinafter described. The signal processing electronic components in head 16 are connected to a remotely located utilization device 24 by means of a two line transmission line 26. Utilization device 24 is preferably a sophisticated data processing system having inventory control programming, periodic report printouts and so forth capable of connection to plural combined magnetostrictive liquid level detector and plural location temperature detector devices 10.

Figure 2:
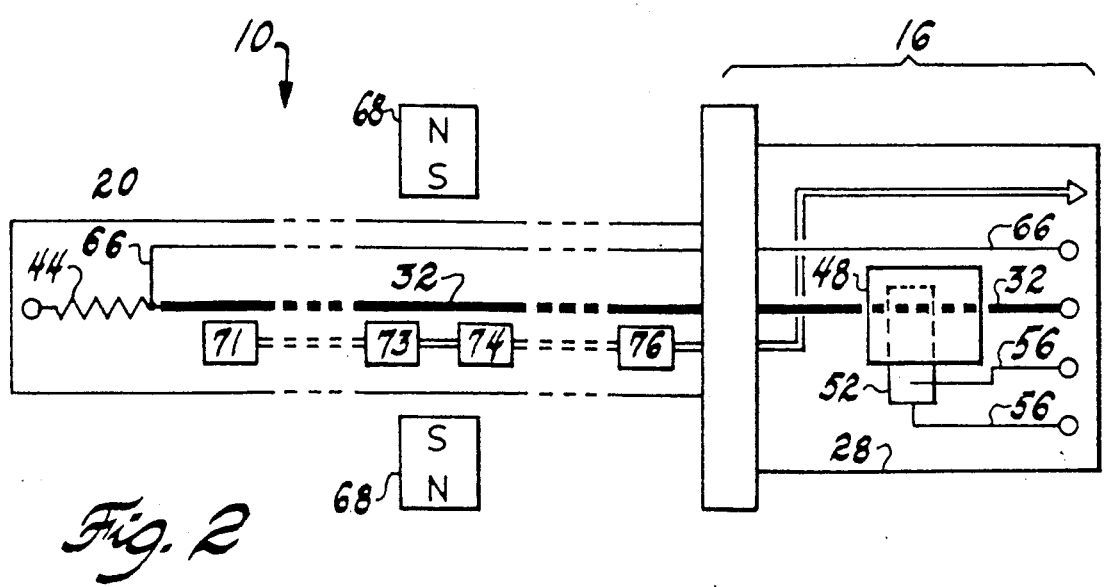
FIG. 2 is a schematic view of the present invention.

FIG. 2 illustrates in schematic form details of the mechanical and electromechanical components of device 10. Head 16 is illustrated with cap 18 removed. A steel base plate 28 is connected in a centered position to accommodate certain electronic components hereinafter described and to provide a structure for the mounting of a magnetostrictive wire 32. Magnetostrictive wire 32 is preferably formed of nickel/iron alloy; a material known as Nispan C is suitable. Wire 32 runs straight through the center of tube 20 and is secured at the head end by solder to a terminal on an insulative pad (not shown) which is secured to base plate 28. Wire 32 extends through a hollow center of head 16 and, as previously mentioned, through the center of tube 20 along substantially the entire length thereof. At the foot end wire 32 is secured by means of a tension spring 44 to the foot end of tube 20. Wire 32 is held in spaced relationship relative to the interior walls of tube 20 by means of rubber spacers (not shown) which may occur at regular or irregular intervals along the entire length of tube 20. There is essentially no limit on the length of tube 20; i.e., transducers of 40 feet in length are just as feasible as those of only a few feet in length. Spring 44 ensures proper tension in the wire so that it runs straight and parallel through tube 20. Further details of the construction of a suitable device 10 may be found in Koski et al., U.S. Pat No. 4,839,590, which is assigned to the same assignee as this application.

Figure 3:
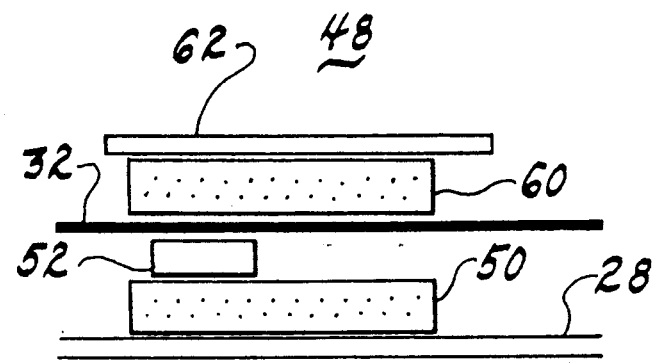
FIG. 3 is a sectional view of a torsional strain transducer suitable for use in the present invention.

A transducer 48 is provided in mechanical contact with wire 32 near the head end. Transducer 48 imparts a torsional strain to wire 32 upon receipt of an electrical command. As better illustrated in FIG. 3, transducer 48 comprises a silicone rubber pad 50 which rests on a surface of base plate 28 under wire 32. A small rectangular piezoelectric crystal 52 rests on pad 50 and provides a seat for wire 32. Piezoelectric crystal 52 includes plating which allows signal wires 56 (see FIG. 2) to be electrically connected to opposite faces. Wire 32 rests on a portion of piezoelectric crystal 52 free of this plating. A second silicone rubber pad 60 is placed on top of wire 32 after it is seated on the exposed, non-conductive portion of piezoelectric crystal 52 and a metal clamp plate 62 is held in place by any suitable means to clamp wire 32 down onto piezoelectric crystal 52. Note that transducer 48 with silicone rubber pads 50 and 60 serves to damp any propagating torsional strain received from the foot end, thereby minimizing reflections.

Piezoelectric crystal 52 operates as a transducer. When a voltage is applied across the faces by means of signal wires 56, piezoelectric crystal 52 expands longitudinally; i.e., in the direction which is transverse to wire 32. In combination with the clamp effect produced by components pads 50 and 60, base plate 28 and clamp plate 62, the expansion of piezoelectric crystal 52 acts like a rack and pinion arrangement to roll wire 32 and impart a localized torsional strain. This torsional strain thereafter propagates along wire 32 from the head end toward the foot end.

Referring back to FIG. 2, the foot end of wire 32 is electrically connected to a fine copper signal return wire 66 which passes in parallel spaced relationship to magnetostrictive wire 32 and through tube 20. The signal return wire 66 is connected to the electronics of device 10. Principal electronic components of device 10 are hereinafter described with reference to FIGS. 4 and 5.

A circular magnet 68 having radially arranged north and south poles is slidably disposed around tube 20 so that it may move along the length of tube 20 over the measurement range. Magnet 68, in the case of a liquid level detector, is contained within the fluid tight float 22 as shown in FIG. 1.

Lastly, FIG. 2 illustrates temperature sensitive resistors 71 to 76. Temperature sensitive resistors 71 to 76 are disposed at spaced intervals along the interior of tube 20. At these locations temperature sensitive resistors 71 to 76 are exposed to the local temperature of the liquid within tank 12. Temperature sensitive resistors 71 to 76 each have an electrical resistance which is dependent upon temperature in a known manner. Measurement of the resistance of one of temperature sensitive resistors 71 to 76, such as by measuring the voltage drop induced by a fixed current, enables determination of the temperature in the vicinity of that resistor.

Figure 4:
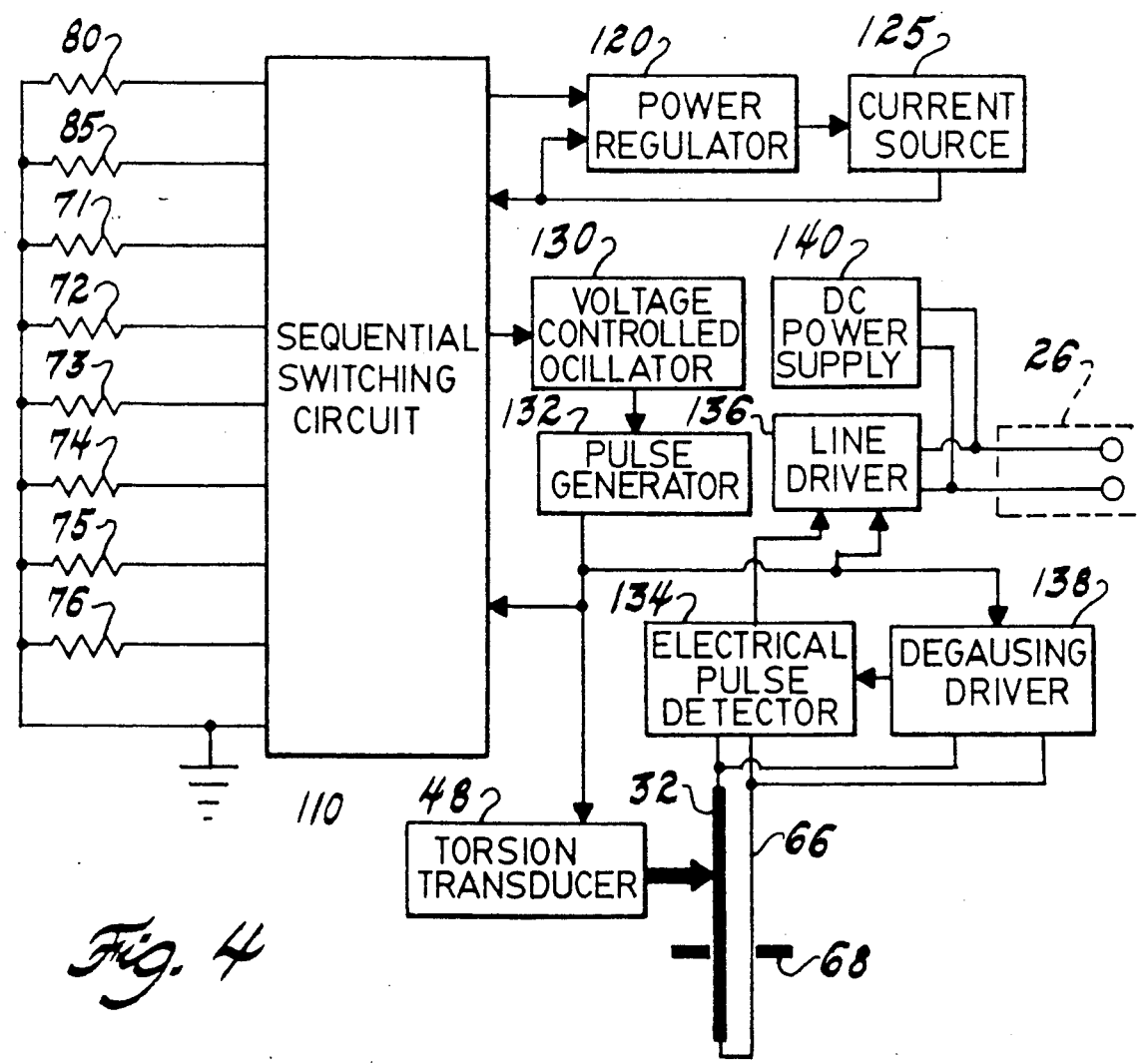
FIG. 4 is a block diagram of the electronics in accordance with the present invention.

FIG. 4 illustrates in schematic diagram form the electronic circuits of the present invention. FIG. 4 illustrates: transmission line 26; magnetostrictive wire 32; torsion transducer 48; signal return wire 66; movable magnet 68; temperature sensitive resistors 71 to 76; reference resistors 80 and 85; sequential switching circuit 110; power regulator 120; current source 125; voltage controlled oscillator circuit 130; pulse generator 132; electrical pulse detector 134; line driver 136; degaussing driver 138; and DC power supply 140. The apparatus illustrated in FIG. 4 operates to detect the liquid level via the position of movable magnet 68, to detect the temperature at the various depths of temperature sensitive resistors 71 to 76, and to transmit these detected quantities to utilization device 24 via transmission line 26.

The combined magnetostrictive linear displacement detector and plural location temperature detector operates as follows. Pulse generator 132 generates a series of short pulses with a pulse period which will be described below. Transducer 48 imparts a localized torsional strain to wire 32 in a manner previously described upon receipt of each pulse from pulse generator 132. This localized torsional strain propagates along wire 32 toward the foot end at a known rate of approximately 9.3 microseconds per inch. As the torsional disturbance passes through the area of influence of magnet 68, it induces a voltage having the waveform of a damped sine wave in wire 32. This voltage travels at near the speed of light (approximately 85 picoseconds per inch) through wire 32 and through signal return wire 66 to electrical pulse detector circuit 134. The interval between the generation of the torsional strain and the detection of the induced electrical pulse is a measure of the liquid level. Because of the very great difference in the speed of propagation of the torsional pulse and of the electrical pulse, this interval is almost wholly a function of the time required for the torsional pulse to travel from transducer 48 to magnet 68.

Line driver 136 is coupled to both pulse generator 132 and electrical pulse detector 134. Line driver 136 produces a pulse for transmission via transmission line 26 both upon receipt of the pulse from pulse generator 132 and upon detection of the induced electrical pulse by electrical pulse detector 134. As will be explained below, pulse generator 132 has a variable pulse repetition period. This variable pulse repetition period is selected to be greater than, and preferably more that two times, the maximum length of time from the generation of the torsional pulse until detection of the induced electrical pulse. This selection of the minimum pulse repetition rate would permit nonoverlap of the time between production of a torsional pulse and detection of its corresponding induced electrical pulse. Selection of this pulse repetition period over two times the maximum time for receiving the induced voltage would permit utilization device 24 at the far end of transmission line 26 to unambiguously determine which pulse of each pair of adjacent pulses received on the transmission line 26 is the start of the measurement interval and which is the end. Thus utilization device 24 can determine the liquid level from the interval between these two pulses.

As explained above, pulse generator 132 has a variable pulse repetition period. This variable pulse repetition period is employed to indicate the various measured temperatures. Sequential switching circuit 110 sequentially couples first reference resistor 80, second reference resistor 85 or one of temperature sensitive resistors 71 to 76 to both current source 125 and voltage controlled oscillator 130. First reference resistor 80 has a resistance value which is independent of temperature and which is less than the expected minimum of temperature sensitive resistors 71 to 76. Second reference resistor 85 has a resistance value which is likewise independent of temperature and which is greater than the expected maximum of temperature sensitive resistors 71 to 76. Current source 125 supplies a predetermined current to sequential switching circuit 110, which is supplied to one of the resistors depending upon the state of switching sequential circuit 110. Sequential switching circuit 110 is also coupled to power regulator 120. Power regulator 120 receives a sample of the voltage across the resistor selected by sequential switching circuit 110 for comparison with the voltage at the output of current source 125. Power regulator 120 regulates the current supplied by current source 125 to stabilize the resistance measurements. The voltage across the resistor selected by sequential switching circuit 110 is applied to the control input to voltage controlled oscillator 130. The frequency of voltage controlled oscillator 130 is dependent upon the voltage at its control input and thus upon the resistance of the selected resistor. The output of voltage controlled oscillator 130 is coupled to pulse generator 132 for control of the pulse repetition rate. Thus the time between successive start pulses represents the resistance of one of the resistors. In the case of connection to one of the temperature sensitive resistors 71 to 76, this time between start pulses corresponds to the measured temperature.

Figure 5:
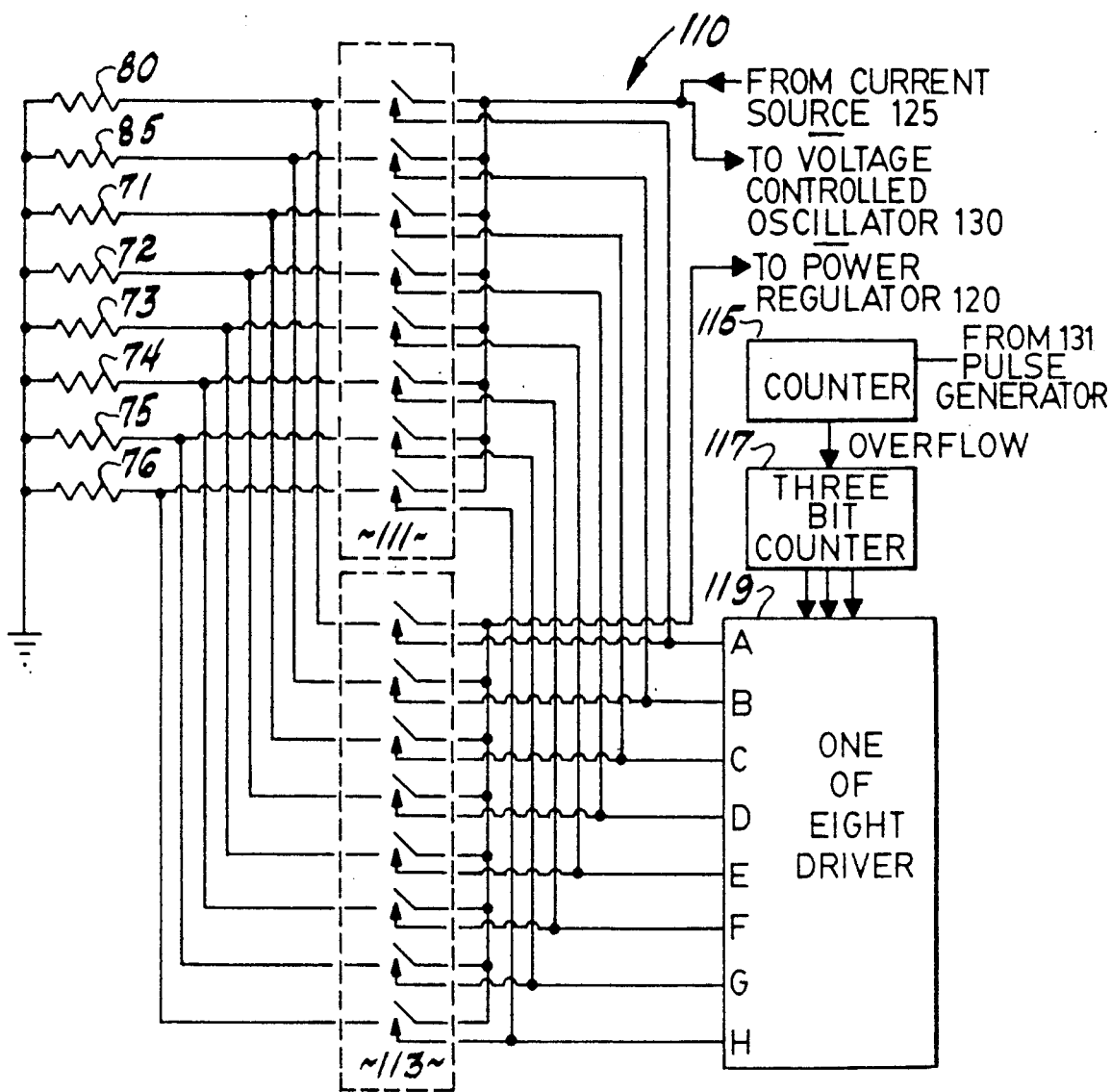
FIG. 5 is a circuit diagram showing the details of the sequential switching circuit illustrated in FIG. 4.

FIG. 5 illustrates sequential switching circuit 110 is greater detail. As shown in FIG. 5, sequential switching circuit 110 includes two 8 by 1 switching circuits 111 and 113. These could be realized as HC4051 CMOS logic circuits. Sequential switching circuit 110 also includes counter 115, three bit counter 117 and one of eight driver circuit 119.

In accordance with the present invention, sequential switching circuit 110 permits measurement of the resistance of each resistor for a predetermined number of cycles before permitting measurement of the next resistor in a predetermined sequence. Pulses generated by pulse generator 130 are applied to the count input of counter 115 (see also FIG. 4). Counter 115 sets the predetermined number of cycles per resistor measured. In the preferred embodiment this is eight or sixteen, thus counter 115 is a three or four bit counter. An overflow output is produced by counter 115 each time it has counted to its maximum value.

Three bit counter 117 receives the overflow output from counter 115. Three bit counter 117 counts from zero to seven and provides the selection of the resistor to be measured. The three bit output of three bit counter 117 is applied to the input of one of eight driver circuit 119. One of eight driver circuit 119 produces an output on one of its eight output terminals (A to H) depending upon the state of the three bit input from three bit counter 117. As three bit counter is cycled through its count, one of eight driver circuit 119 produces an output on each of the eight output lines A to H.

The sequence of operations is as follows. Initially one of eight driver circuit 119 causes switching circuit 111 to connect current source 125 and voltage controlled oscillator 130 to first reference resistor 80 and causes switching circuit 113 to connect power supply regulator 120 to first reference resistor 80. When the eight or sixteen cycles set by counter 115 are complete, three bit counter 117 is incremented. This causes one of eight driver circuit 119 to control switching circuits 111 and 113 to select second reference resistor 85. When counter 115 again overflows, one of eight driver circuit 119 selects temperature sensitive resistor 71. On each further overflow of counter 115 the next temperature sensitive resistor 72, 73, 74, 75 and 76 is selected until three bit counter 117 overflows and again selects first reference resistor 80. The exact sequence of selection by one of eight driver circuit 119 is set by the connections of the output lines A to H to the control inputs of switching circuits 111 and 113.

In accordance with the present invention the selection sequence must be in a fixed order that includes selection of one of reference resistors 80 and 85 followed by selection of the other of reference resistors 80 and 85. The order of selection of the reference resistors or of selection temperature sensitive resistors 71 to 76 is not important so long is it is a known fixed order. The reason for this limitation on the order of selection will be explained below. In summary, sequential switching circuit 110 causes line driver circuit 136 to produce a set of eight or sixteen pulse pairs (as set by the total count of counter 115) for one of reference resistors 80 and 85, a set of pulse pairs for the other reference resistor, followed by sets of pulse pairs for each of the temperature sensitive resistors 71 to 76 in turn. Within each set of pulse pairs, the time between pulse pairs is indicative of the liquid level and the time from the first pulse in one pair until the first pulse in the next pair is indicative of the resistance of the corresponding resistor. In the case of temperature sensitive resistors 71 to 76, this resistance measure also corresponds to the temperature in the region of the corresponding temperature sensitive resistor.

Referring back to FIG. 4, power for the circuits is supplied via transmission line 26. In accordance with the preferred embodiment DC power supply 140 supplies power to all the circuits of FIG. 4 from a DC voltage on transmission line 26 provided by utilization device 24. Line driver 136 is AC coupled to transmission line 26. This permits discrimination between the DC level provided by utilization device 24 and the pulses provided line driver 136 using know filtering techniques. This permits the same transmission line to be used to supply power and to transmit the data.

FIG. 4 further illustrated degaussing driver 138. Degaussing driver 138 is coupled to pulse generator circuit 132. Degaussing driver 138 is also coupled to magnetostrictive wire 32 and signal return wire 66. Degaussing driver 138 is provided to supply electrical signals to magnetostrictive wire 32 for demagnetizing or degaussing this wire. Degaussing is provided because otherwise, magnet 68 may induce some residual magnetism in a part of wire 32. This residual magnetism may cause hysteresis errors in the liquid level measurement if magnet 68 is moving, particularly when magnet 68 reverses its direction. This degaussing takes place by production of an electrical pulse on the series combination of magnetostrictive wire 32 and signal return wire 66. Degaussing driver 138 produces one or more of these degaussing pulses during a time interval following detection of the pulse generated by pulse generator 132. This time interval is after the latest expected detection of an electrical signal by said electrical pulse detector 134 and prior to the earliest expected generation of the next pulse by pulse generator 132. The latest expected detection of an electrical signal by said electrical pulse detector 134 occurs when magnet 68 is furthest from the head end of magnetostrictive wire 32. The earliest expected generation of the next pulse by pulse generator 132 occurs when the resistor selected by sequential switching circuit 110 has the minimum resistance value. This would ordinarily be when one of the reference resistors 80 and 85 is selected. During production of the degaussing pulses, degaussing driver 138 sends a signal to electrical pulse detector 134 to render it insensitive to electrical pulses on magnetostrictive wire 32 and signal return wire 66. This prevents the generation of false signals by line driver 136 when a degaussing pulse is present.

Depending upon the requirements of the particular magnetostrictive wire, differing schedules of degaussing pulses may be generated by degaussing driver 138. In the simplest case, degaussing driver 138 produces one degaussing pulse for each pulse from pulse generator 132. Alternatively, degaussing driver 138 could produce multiple degaussing pulses, all within the limited time window, for each pulse from pulse generator 132. Lastly, it is feasible that degaussing driver 138 produces a single degaussing pulse for each predetermined number of pulses from pulse generator 132.

Figure 6:
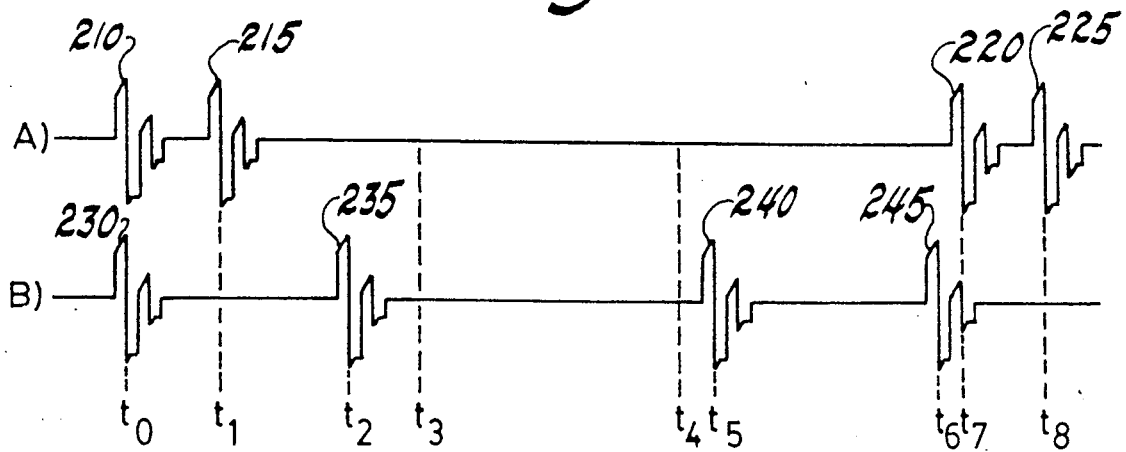
FIG. 6 is a timing diagram of the pulses produced by the present invention.

FIG. 6 illustrates the timing of pulses produced by line driver 136 for transmission via transmission line 26. Note that FIGS. 6 A) and 6 B) illustrate the provision of an AC pulse from line driver 138 on the DC level supplied by utilization device 24. The timing diagrams of FIG. 6 illustrate two extreme cases. These timing diagrams illustrate the timing relationships of the present invention.

FIG. 6 A) illustrates the case with the minimum of time between pulses within a pulse pair and the maximum of time between the first pulse of each pair. Pulse 210 is the start pulse of a pair of pulses occurring at time $t_0$. This corresponds to the time of generation of a pulse by pulse generator 132. Pulse 215 is the end pulse of a pair of pulses occurring at time $t_1$. The time interval between $t_0$ and $t_1$ corresponds to the full liquid level with the minimum measurement interval when magnet 68 is as close as possible to the head end of magnetostrictive wire 32. Pulse 220 at time $t_7$ is the start pulse of the next pair of pulses, with pulse 225 at time $t_8$ being the corresponding end pulse The time interval between time $t_7$ at the start of the measurement interval and time $t_8$ at the end of the measurement interval is another indication of the full liquid level. The pulse period, the length of time between time $t_0$ at start pulse 210 and time $t_7$ at start pulse 220 is an indication of a resistance level, in this case the resistance of second reference resistor 85, which is the maximum resistance value of all the resistors.

FIG. 6 B) illustrates the case with the maximum of time between pulses within a pulse pair and the minimum of time between the first pulse of each pair. Pulse 230 is the start pulse of a pair of pulses occurring at time $t_0$. Pulse 235 is the end pulse of a pair of pulses occurring at time $t_2$. The time interval between $t_0$ and $t_2$ corresponds to the empty liquid level with the maximum measurement interval when magnet 68 is as far as possible from the head end of magnetostrictive wire 32. Pulse 240 at time $t_5$ is the start pulse of the next pair of pulses, with pulse 245 at time $t_6$ being the corresponding end pulse. The time interval between time $t_5$ and time $t_6$ is another indication of the empty liquid level. The length of time between time $t_0$ and time $t_5$ is an indication of a resistance level, in this case the resistance of first reference resistor 89, which is the minimum resistance value of all the resistors.

The various time intervals and measurement sequence have been selected to permit utilization device 24 to unambiguously interpret the data received. The minimum pulse period (the time interval from time $t_0$ and time $t_5$) is selected as more than twice the maximum measurement period. This permits utilization device 24 to determine which pulse is the first pulse of each pair, thus providing the correct liquid level measurement. The provision of making resistance measurements of the reference resistors adjacent in the measurement sequence causes the greatest possible difference in pulse period to occur between these measurements. This permits utilization device 24 to synchronize with the sequence of resistance measurements. Thus utilization device 24 has information regarding the current liquid level and the temperature at various depths. Using this information, and knowing the depth of each temperature measuement resistor so that a temperature measurement can be discarded if the liquid level is below that temperature sensitive resistor, utilization device 24 can compute a temperature corrected liquid volume. This temperature corrected liquid volume can be used to determine inflows, outflows or detect leaks.

We claim:

1. A combined magnetostrictive linear displacement detector and plural location temperature detector comprising:
   a magnetostrictive wire having opposite head and foot ends and defining a measurement interval therebetween;
   a return wire having a foot end electrically coupled to said foot end of said magnetostrictive wire and a head end;
   a magnet disposed for displacement along the said magnetostrictive wire within said measurement interval, the position of said magnet within said measurement interval being the linear displacement detected;
   a plurality of temperature dependent resistors disposed at intervals within said measurement interval, each of said plurality of temperature dependent resistors having a resistance dependent upon temperature;
   a first reference resistor having a resistance substantially independent of temperature which is less than the lowest expected resistance of said plurality of temperature dependent resistors;
   a second reference resistor having a resistance substantially independent of temperature which is greater than the higher expected resistance of said plurality of temperature dependent resistors;
   a sequential switching circuit connected to each of said plurality of temperature dependent resistors, and to said first and second reference resistors, said sequential switching circuit having a common terminal for sequentially and alternately connecting to said common terminal one resistor selected from the set of said first and second reference resistors, and said plurality of temperature dependent resistors in a predetermined sequence;
   a resistance measurement means connected to said common terminal of said sequential switching circuit for measuring the resistance of said one resistor connected to said common terminal;
   a pulse generator connected to said resistance measurement means for generating a predetermined number of pulses having a pulse period therebetween corresponding to said resistance measured by said resistance measuring means, the minimum such pulse period being greater than the maximum time required for a torsional strain to propagate the length of said magnetostrictive wire;
   a torsional motion excitation means disposed proximate to said head end of said magnetostrictive wire and connected to said pulse generator for imparting a predetermined torsional motion within said magnetostrictive wire for each pulse generated by said pulse generator;
   an electrical pulse detection means electrically coupled to said head end of said magnetostrictive wire and said head end of said return wire for detecting an electrical signal through said magnetostrictive wire induced by the passage of torsional motion within said magnetostrictive wire by the position of said magnet;
   a two-wire transmission line; and
   an electrical line driver circuit connected to said pulse generator, said electrical excitation detection means and said two-wire transmission line for transmitting an electrical signal via said two-wire transmission line when either said pulse generator generates a pulse or said electrical pulse detection means detects an electrical signal.

2. The combined magnetostrictive linear displacement detector and plural location temperature detector as claimed in claim 1, wherein:
   said predetermined number of pulses having a pulse period therebetween corresponding to each resistance measured by said resistance measuring means of said pulse generator is sixteen.

3. The combined magnetostrictive linear displacement detector and plural location temperature detector as claimed in claim 1, wherein:
   said predetermined number of pulses having a pulse period therebetween corresponding to each resistance measured by said resistance measuring means of said pulse generator is eight.

4. The combined magnetostrictive linear displacement detector and plural location temperature detector as claimed in claim 1, further comprising:
   a degaussing driver circuit connected to said magnetostrictive wire, said return wire and said pulse generator for applying at least one degaussing electrical pulse to said magnetostrictive wire and said return wire for degaussing said magnetostrictive wire following at least some of said pulses generated by said pulse generator at a time relative to the most recent pulse generated by said pulse generator after the latest expected detection of an electrical signal by said electrical pulse detection means and prior to the earliest expected generation of the next pulse by said pulse generator.

5. The combined magnetostrictive linear displacement detector and plural location temperature detector as claimed in claim 4, wherein:

said degaussing driver circuit applies a single degaussing electrical pulse to said magnetostrictive wire and said return wire following each pulse generated by said pulse generator.

6. The combined magnetostrictive linear displacement detector and plural location temperature detector as claimed in claim 4, wherein:

said degaussing driver circuit applies a predetermined plurality of degaussing electrical pulses to said magnetostrictive wire and said return wire following each pulse generated by said pulse generator.

7. The combined magnetostrictive linear displacement detector and plural location temperature detector as claimed in claim 4, wherein:

said degaussing driver circuit applies at least one degaussing electrical pulse to said magnetostrictive wire and said return wire following each predetermined number of pulses generated by said pulse generator.

8. The combined magnetostrictive linear displacement detector and plural location temperature detector as claimed in claim 1, wherein:

said sequential switching circuit sequentially and alternately connects said common terminal to one of said first and second reference resistors, then to the other of said first and second reference resistors, and then to said plurality of temperature sensitive resistors in a predetermined sequence.

9. The combined magnetostrictive linear displacement detector and plural location temperature detector as claimed in claim 1, wherein:

said minimum pulse period of said pulse generator being greater than twice the maximum time required for a torsional strain to propagate the length of said magnetostrictive wire.

10. The combined magnetostrictive linear displacement detector and plural location temperature detector as claimed in claim 9, further comprising:

a degaussing driver circuit connected to said magnetostrictive wire, said return wire and said pulse generator for applying at least one degaussing electrical pulse to said magnetostrictive wire and said return wire for degaussing said magnetostrictive wire following at least some of said pulses generated by said pulse generator at a time relative to the most recent pulse generated by said pulse generator between said maximum time required for a torsional strain to propagate the length of said magnetostrictive wire and twice said maximum time required for a torsional strain to propagate the length of said magnetostrictive wire.

11. A combined magnetostrictive linear displacement detector and plural location temperature detector comprising:

a magnetostrictive wire having opposite head and foot ends and defining a measurement interval therebetween;

a return wire having a foot end electrically coupled to said foot end of said magnetostrictive wire and a head end;

a magnet disposed for displacement along the said magnetostrictive wire within said measurement interval, the position of said magnet within said measurement interval being the linear displacement detected;

a plurality of temperature dependent resistors disposed at intervals within said measurement interval, each of said plurality of temperature dependent resistors having a resistance dependent upon temperature;

a first reference resistor having a resistance substantially independent of temperature which is less than the lowest expected resistance of said plurality of temperature dependent resistors;

a second reference resistor having a resistance substantially independent of temperature which is greater than the highest expected resistance of said plurality of temperature dependent resistors;

a sequential switching circuit connected to each of said plurality of temperature dependent resistors, and to said first and second reference resistors, said sequential switching circuit having a common terminal for sequentially and alternately connecting said common terminal to one of said first and second reference resistors, then to the other of said first and second reference resistors, and then to said plurality of temperature dependent resistors in a predetermined sequence;

a resistance measurement means connected to said common terminal of said sequential switching circuit for measuring the resistance of said one resistor connected to said common terminal;

a pulse generator connected to said resistance measurement means for generating a predetermined number of pulses having a pulse period therebetween corresponding to said resistance measured by said resistance measuring means, the minimum such pulse period being greater than the maximum time required for a torsional strain to propagate the length of said magnetostrictive wire;

a torsional motion excitation means disposed proximate to said head end of said magnetostrictive wire and connected to said pulse generator for imparting a predetermined torsional motion within said magnetostrictive wire for each pulse generated by said pulse generator;

an electrical pulse detection means electrically coupled to said head end of said magnetostrictive wire and said head end of said return wire for detecting an electrical signal through said magnetostrictive wire induced by the passage of torsional motion within said magnetostrictive wire by the position of said magnet;

a two-wire transmission line; and an electrical line driver circuit connected to said pulse generator, said electrical excitation detection means and said two-wire transmission line for transmitting an electrical signal via said two-wire transmission line when either said pulse generator generates a pulse or said electrical pulse detection means detects an electrical signal.

12. The combined magnetostrictive linear displacement detector and plural location temperature detector as claimed in claim 11, further comprising:
a degaussing circuit connected to said magnetostrictive wire, said return wire and said pulse generator for applying at least one degaussing electrical pulse to said magnetostrictive wire and said return wire for degaussing said magnetostrictive wire following at least some of said pulses generated by said pulse generator at a time relative to the most recent pulse generated by said pulse generator after the latest expected detection of an electrical signal by said electrical pulse detection means and prior to the earliest expected generation of the next pulse by said pulse generator.

13. The combined magnetostrictive linear displacement detector and plural location temperature detector as claimed in claim 11, wherein:
said minimum pulse period of said pulse generator being greater than twice the maximum time required for torsional strain to propagate the length of said magnetostrictive wire.

14. The combined magnetostrictive linear displacement detector and plural location temperature detector as claimed in claim 13, further comprising:
a degaussing driver circuit connected to said magnetostrictive wire, said return wire and said pulse generator for applying at least one degaussing electrical pulse to said magnetostrictive wire and said return wire for degaussing said magnetostrictive wire following at least some of said pulses generated by said pulse generator at a time relative to the most recent pulse generated by said pulse generator between said maximum time required for a torsional strain to propagate the length of said magnetostrictive wire and twice said maximum time required for a torsional strain to propagate the length of said magnetostrictive wire.

15. A combined magnetostrictive linear displacement detector and plural location temperature detector comprising:
a magnetostrictive wire having opposite head and foot ends and defining a measurement interval therebetween;
a return wire having a foot end electrically coupled to said foot end of said magnetostrictive wire and a head end;
a magnet disposed for displacement along the said magnetostrictive wire within said measurement interval, the position of said magnet within said measurement interval being the liner displacement detected;
a plurality of temperature dependent resistors disposed at intervals within said measurement interval, each of said plurality of temperature dependent resistors having a resistance dependent upon temperature;
a first reference resistor having a resistance substantially independent of temperature which is less than the lowest expected resistance of said plurality of temperature dependent resistors;
a second reference resistor having a resistance substantially independent of temperature which is greater than the highest expected resistance of said plurality of temperature dependent resistors;
a sequential switching circuit connected to each of said plurality of temperature dependent resistors, and to said first and second reference resistors, said sequential switching circuit having a common terminal for sequentially and alternately connecting said common terminal to one of said first and second reference resistors, then to the other of said first and second reference resistors, and then to said plurality of temperature dependent resistors in a predetermined sequence;
a resistance measurement means connected to said common terminal of said sequential switching circuit for measuring the resistance of said one resistor connected to said common terminal;
a pulse generator connected to said resistance measurement means for generating a predetermined number of pulses having a pulse period therebetween corresponding to said resistance measured by said resistance measuring means, the minimum such pulse period being greater than twice the maximum time required for a torsional strain to propagate the length of said magnetostrictive wire;
a degaussing driver circuit connected to said magnetostrictive wire, said return wire and said pulse generator for applying at least one degaussing electrical pulse to said magnetostrictive wire and said return wire for degaussing said magnetostrictive wire following at least some of said pulses generated by said pulse generator at a time relative to the most recent pulse generated by said pulse generator between said maximum time required for a torsional strain to propagate the length of said magnetostrictive wire and twice said maximum time required for a torsional strain to propagate the length of said magnetostrictive wire;
a torsional motion excitation means disposed proximate to said head end of said magnetostrictive wire and connected to said pulse generator for imparting a predetermined torsional motion within said magnetostrictive wire for each pulse generated by said pulse generator;
an electrical pulse detection means electrically coupled to said head end of said magnetostrictive wire and said head end of said return wire for detecting an electrical signal through said magnetostrictive wire induced by the passage of torsional motion within said magnetostrictive wire by the position of said magnet;
a two-wire transmission line; and
an electrical line driver circuit connected to said pulse generator, said electrical excitation detection means and said two-wire transmission line for transmitting an electrical signal via said two-wire transmission line when either said pulse generator generates a pulse or said electrical pulse detection means detects an electrical signal.

* * * * *

UNITED STATES PATENT AND TRADEMARK OFFICE
CERTIFICATE OF CORRECTION

PATENT NO. : 5,050,430

DATED : September 24, 1991

INVENTOR(S) : Begin et al.

It is certified that error appears in the above-identified patent and that said Letters Patent is hereby corrected as shown below:

Column 10, line 5, replace "higher" with --highest--;

Column 13, line 4, replace "degaussing circuit" with --degaussing driver circuit--.

Signed and Sealed this

Ninth Day of March, 1993

Attest:

STEPHEN G. KUNIN

Attesting Officer

Acting Commissioner of Patents and Trademarks